United States Patent [19]

Arnold et al.

[11] Patent Number: 4,895,518

[45] Date of Patent: Jan. 23, 1990

[54] COMPUTERIZED DIAGNOSTIC REASONING EVALUATION SYSTEM

[75] Inventors: Jean M. Arnold, Parsippany; William H. Greenhalgh, Neshanic Station, both of N.J.

[73] Assignee: The University of Michigan, Ann Arbor, Mich.

[21] Appl. No.: 115,720

[22] Filed: Nov. 2, 1987

[51] Int. Cl.$^4$ .......................... G09B 19/00; G09B 7/00
[52] U.S. Cl. .................................... 434/118; 434/236; 434/335; 434/350
[58] Field of Search ........................ 434/335, 236, 118

[56] References Cited

U.S. PATENT DOCUMENTS 4,671,772  6/1987  Slade et al. ........................... 434/236

Primary Examiner—Edward M. Coven
Assistant Examiner—Jessica J. Harrison
Attorney, Agent, or Firm—Rohm & Monsanto

[57] ABSTRACT

A system for assessing the diagnostic reasoning ability of learners engaged in a field of study employs a coded situation test and utilizes a computerized process for grading examinations taken by the learners and for rating their capacity for diagnostic reasoning. The computerized diagnostic reasoning evaluation instrument embodies storage in a test file of the situation test description which describes, illustratively in narrative form, a plurality of problems associated with the situation test employing a plurality of phrases. Each phrase has associated therewith a respective phrase identification symbol which is used by the examinee to record answers to the examination. In a nursing embodiment of the invention, each learner selects from a listing of possible problems. Those problems which are considered by the learner to be significant and present in the situation test are then identified by storing their respectively associated code symbol. In practice, the answers by the examinee may be entered directly into a computer by the examinee, or may be recorded by the examinee on paper and later entered into the grading computer by someone else. Subsequently, the learner is asked to identify which of the selected problems are significant using supporting data, and create from coded objectives, criteria, interventions, and rationale listings an intervention plan which is proposed by the learner to resolve the major problems. Grading is achieved by reference to a computerized answer key generated by an expert, such as a teacher, and stored in a computer memory as an answer key.

5 Claims, 11 Drawing Sheets

COMPUTERIZED DIAGNOSTIC REASONING EVALUATION SYSTEM

BACKGROUND OF THE INVENTION

This invention relates generally to evaluation systems, and more particularly, to a system which employs a computer for assessing the diagnostic reasoning skills of an individual, particularly of a learner/trainee in any field of study using situations, including the case method of study, or where evaluation of learner performance is achieved using situation tests.

In a variety of disciplines, the situation test method of learner evaluation has been accepted as the preferred approach. The case study methodology has associated therewith the significant advantages of providing a vehicle for generating discussion among learners and dialogue with a teacher. Additionally, the study of a case affords the learner considerable opportunity to apply his or her knowledge and reasoning skills in a predetermined situation test.

One of the major problems in the case study method of teaching is in grading a multiplicity of learners objectively and consistently. For example, in institutional teaching situations where hundreds of learners are taking the same test, the percentage of agreement among the various experts who grade the tests is low. This percentage remains low even when the experts are provided with grading criteria.

One field which has traditionally employed the case study method is health care education. It is extremely important that persons involved in nursing and other health-related disciplines have well-developed problem-solving and critical thinking capabilities. An individual practicing in these fields is required to determine the problems of a patient from a case history, or narrative, which includes factual information derived objectively and subjectively. The individual must then select from the problems those which are of primary importance to warrant an intervention. Of course, once there is a determined need for intervention, an intervention plan must be developed. It is significant in the education process of such individuals to ascertain, preferably by quantification, the extent to which they have succeeded in developing their critical thinking and problem-solving capabilities.

It is, therefore, an object of this invention to provide a system for evaluating reasoning and analysis capability of individuals.

It is another object of this invention to provide an evaluation system which assists a teacher/trainer in identifying aptitudes and deficiencies in learners relating to identifying problems in given situations and selecting data in support of these problems.

It is also an object of this invention to provide an evaluation system which assists a teacher in identifying aptitudes and deficiencies in learners relating to planning of corrective intervention after identifying problems in given situations.

It is a further object of this invention to provide a computerized evaluation system which assists a teacher in identifying aptitudes and deficiencies in learners relating to identifying problems and planning corrective intervention in given situations.

It is additionally an object of this invention to provide a computerized system for assisting a teacher in assessing the ability of a learner to identify major problems in a plurality of potential problems.

It is yet a further object of this invention to provide a computerized system for assessing the diagnostic reasoning skills of learners in health-related fields of study.

It is also another object of this invention to provide a computerized system for assessing diagnostic reasoning skills of learners in fields of study which use situation tests to assist in evaluating learners.

It is yet an additional object of this invention to provide a computerized system for assisting a teacher of a field of study which employs the situation test method in assessing the diagnostic reasoning skills of a large number of learners.

It is still another object of this invention to provide a computerized system for evaluating and assessing the problem identification skills of learners.

It is a yet further object of this invention to provide an objective, criterion-based, computerized testing and evaluation system.

It is also a further object of this invention to provide a testing and evaluation system which can provide substantially immediate feedback of learner performance to a teacher and a learner.

It is additionally another object of this invention to provide a testing and evaluation system for use in conjunction with a computer, whereby the examinations of a plurality of learners are objectively evaluated in problem identification and intervention planning.

A still further object of this invention is to provide a testing and evaluation system for use in conjunction with a computer, whereby the diagnostic reasoning capability of a learner is evaluated substantially irrespective of the extent to which the learner completed the examination.

An additional object of this invention is to provide a testing and evaluation system for use in conjunction with a computer, whereby evaluation of the diagnostic reasoning capability of a learner is evaluated by monitoring the binary states of at least two software flags.

Yet another object of this invention is to provide a testing and evaluation system for use in conjunction with a computer, whereby an overall performance score of a learner is increased by extra effort on the part of the learner in completing an examination.

Another object of this invention is to provide a testing and evaluation system for use in conjunction with a computer, whereby correctness of rationale in support of an action is considered in the grading of a learner.

SUMMARY OF THE INVENTION

The foregoing and other objects are achieved by this invention which provides a method of operating a computing machine to assess the reasoning ability of an individual to be evaluated. In accordance with the invention, a situation test description which describes a plurality of characteristics associated with a situation test is stored in a test file. At least one question pertaining to the situation test, as set forth in the situation test description, to be answered by the individual is stored in a question file. In one embodiment of the invention, the question is in the form of a listing of choices whereby the individual to be evaluated selects one or more predetermined problems he or she believes is related to the situation test. A problem identification file sees and stores a problem identification response by the individual to be evaluated. The information received by the problem identification file is in the form of a code number corresponding to at least a selected one of the possible choices.

In a preferred embodiment of the invention, the phrase identification symbols associated with the plurality of phrases which form the situation test description, are stored in an answer file by the learner being evaluated to identify the specific ones of the phrases which support the answers selected by the learner. Thus, the learner forms a data relationship between the data provided in the narrative of the situation test, and the data which forms the bases of the questions to be answered, or problems to be solved, by the learner during the examination. The stored answers, which may include identification numbers or symbols associated with selected ones of listed possible problems, the components of an intervention plan to be proposed by the learner, and the supporting phrases of the situation test description are compared to predetermined answers stored in an answer key, which will be discussed hereinbelow, during grading.

Further in accordance with the invention, the intervention plan proposed by the individual to resolve a major one of the problems identified in the problem data relationship is stored in an intervention plan selection file. As indicated, in certain embodiments, the intervention plan selection file may be included in the answer file. The problem identification file includes specific data elements from the situation test description. The data elements are in the form of an identification file which may be part of the intervention plan file. It is to be understood that the term "files" correspond to any memorialization arrangement, such as computer memory, and need not have associated therewith any nomenclature.

In one embodiment of the invention, the intervention plan stored in the intervention plan selection file consists of a plurality of coded selection options selected by the individual to be evaluated. The plan may included coded listings of objectives, criteria, interventions, and reasons. Thus, within each such component of the intervention plan, there are listings of choices, each choice having an associated code number. In operation, the individual to be evaluated is requested to select one objective and at least one criteria for each problem in the problem identification file which has been identified as being major. The individual to be evaluated therefore will select from a plurality of each of objectives, criteria, interventions, and reasons. However, not every intervention plan need incorporate all such components during testing. Moreover, the identification of the problems, as well as the intervention plan, can be edited by the learner being evaluated prior to submission of the examination for grading.

In a computerized embodiment, an answer key is stored on a memory disk by a teacher or administrator of the examination. In a practical embodiment of the invention, the software can be accommodated on one disk, and includes a file portion for making separate disks for administration of the examination. The individual being evaluated can enter the answers to the examination at a computer or an answer sheet which then is entered into a computer.

The system permits a teacher to make disks containing the examination for distribution to individuals being evaluated, or the administrators of the examination. As will be described herein, the learner test disk will also contain at least a portion of a known operating system, such as a disk operating system, to permit the learner disk to be self-loading.

As previously noted, in a preferred embodiment of the invention, the software system contains an editor portion which permits the teacher to create an answer key for a given situation test. The answer key can be edited by the teacher at any time. There is further provided a disk-making portion which is used to place the examination on the separate learner disks. Finally, a correction portion of the software package is employed to grade the responses to the situation test. In a preferred embodiment, the grading process generates a print-out which describes the pattern of reasoning of the tested individual which yield three numerical scores: problem identification score, intervention plan score, and total score. The resulting plurality of scores can be subjected to group analysis. Thus, groups of learners can be compared, thereby permitting diagnosis of reasoning deficiencies which apply to the group of learners as a whole, so as to enable development of corrective training program.

A measure of security is achieved by the production of an individual disk(s) for each of the learners being evaluated. In this manner, a learner cannot obtain the test results of any other learner. Additionally, the learners can be identified by learner numbers, which permit posting of grades in a conventional manner without identifying the particular individuals.

In the practice of the invention, the system, from the standpoint of the learner, is initialized, illustratively by booting in a conventional manner, and identification information is requested. After the entry of the identification information, the answer files are opened and instructions are displayed on the screen to commence the examination. When the examination is completed, the information is stored in the answer files on the disk, and the answer files are closed.

During the examination, the test begins with the problem identification section. After reading the situation test description, the individual being evaluated selects from a listing of possible problems, those codes which are believed associated with problems raised by the situation test description, which in a specific illustrative embodiment may be a medical situation in narrative form. Prior to proceeding with the generation of an intervention plan, the learner being evaluated is afforded an opportunity to edit the answers to the problem identification section, prior to their being entered on the computer disk.

Upon completion of the problem identification section, the learner being evaluated commences the intervention plan section. In this section, the learner is requested to select a predetermined number of the problems identified in the previous section on the basis of a determination by the learner that their significance as problems is sufficient to warrant intervention. As previously indicated, the intervention plan is created by selecting appropriate choices from several options within listings of problems, objectives, criteria, interventions, and rationale, for each major problem, or each problem of primary importance. As also previously indicated, the listings are coded by number, each listing including correct and incorrect choices.

An "objective" is defined as a measurable behavior expected to guide intervention. "Criteria" is an outcome which describes achievement of objectives. An "intervention plan" is defined as a plan of action for solving a given situation. In a nursing embodiment of the invention, multiple interventions, illustratively five interventions, can be listed for each major problem along with rationale. "Rationale" is a reason cited by the learner for specific action.

In this embodiment, the intervention plan for each major problem is rated. For example, each correct action and an associated correct reason receive a score of one point. Thus, only one-half point is given if action is correct, but the rational is incorrect. Thus, in this embodiment, the classifications of intervention plan can include "correct intervention," "intervention plan with some validity," and "intervention plan without validity." In this particular embodiment, if the intervention plan for a selected major problem is correct, it is labeled as "correct intervention." If three of five actions are correct, it is labeled as "intervention with some validity." A rating of "intervention without validity" occurs when four of five actions entered are incorrect. An intervention rating is calculated for each of the major problems.

In a specific illustrative embodiment of the invention which is suitable for use in health care education, particularly nursing education, an illustrative respondent version of an examination directed to a case study would appear as follows:

NURSING CASE STUDY EXAMINATION

Directions

You are the nurse responsible for the situation described in the following case study. Read the following definition of terms before you begin with the case study.

Definitions:

Nursing Assessment and Nursing Care: The elements inherent in this process are (1) problem identification, (2) major problem identification, (3) objectives, (4) criteria, (5) interventions, and (6) rationale.

Patient or Client Problems: an identified or potential unmet need of the client, family, or nurse.

Problem Choices: choices of all problems for case study description.

Supporting Data: direct or implied data from the case study description resulting in the identification of a particular problem.

Major Problems: most important problems for case study description.

Objectives: behaviors expected in the patient which provide direction for the intervention plan/nursing care section.

Criteria: measurable outcomes of an objective.

Interventions: intervention choices to be taken by nurse for each major problem.

Rationale for Interventions: reason cited by nurse for a specific nursing intervention.

There are two answer sheets provided. Complete the problem identification section by selecting the problems from the list provided. Indicate your choices by number on the problem identification section of the answer sheet. Next select the supporting data phrases from the case study description. Indicate your choices by number on the supporting data section of the answer sheet.

Next you will complete the nursing care section. Select from your problem choices the most important problems. Next select the patient-centered objective, criteria, interventions and rationale for each major problem identified using the listings provided. Indicate your choices by number on the nursing care answer sheets. Feel free to mark up this case study.

Avoid guessing so your choices reflect what you would actually do in a situation of this nature.

You may use the work sheet to briefly write your answers in short phrases and as a means to visualize your choices. Use an identifying number by each short phrase so your choices can be easily transferred to the answer sheets.

Thanks for your participation.

MISS G: ACUTE CARE (1) Miss Giordano is an 84 year old woman who was admitted to the hospital from a nursing home last night. (2) She required hospitalization due to a fractured right hip which she sustained when she fell last evening. (3) Miss Giordano fell when she tried to climb out of bed over the side rails (4) while wearing a posey vest restraint.

(5) Miss Giordano was admitted to the nursing home from a sheltered boarding home one month ago. (6) According to nursing home staff, she required nursing home admission because in the boarding home she became (7) increasingly confused over a period of several months, (8) began to wander, and (9) became incontinent of bowel and bladder. (10) During her one month nursing home stay, Miss Giordano lost 10 pounds although (11) she consistently ate all of the food on her tray at every meal. (12) She paced around the unit all day, (13) despite efforts to get her to rest or (14) participate in Recreation Therapy. (15) She was usually restless at night (16) and often required restraints to get her to stay in bed. (17) The nursing home staff provided complete assistance with bathing and dressing, (18) although they were able to encourage her to comb her own hair in front of the mirror. (19) Miss Giordano frequently asked nursing home staff where the bathroom was, (20) but often soiled her clothing or the floor. (21) When this happened, the nursing home staff reported that she either cried or attempted to hide.

(22) Miss Giordano was never married, lived alone and was a grammar school teacher until her retirement at age 65. (23) Her parents came to America from Italy and her religion is Roman Catholic. (24) Her sister, who is her only living relative, says that she was a hardworking fastidious person all of her life. (25) She was devoted to her job and (26) kept to herself for the most part after she retired. (27) Her health was always good, and she was never hospitalized until now. (28) Her medical diagnosis in the nursing home was Dementia, and her only (29) medication was Restoril 15 mg po HS.

(30) In the hospital, Miss Giordano has been quiet and cooperative with the nursing staff. (31) She is disoriented to time and place, (32) but responds to her own name and can identify herself. (33) She seemed to recognize her sister and brother-on-law when they visited last night, (34) however, she called them by the wrong names. (35) She is on complete bed rest (36) but in no apparent discomfort except during position change. (37) The admitting physician prescribed Darvocet N-100, which she received at 2 AM. (38) Miss Giordano herself tells you: "This is a nice place, but I have to go home to my mother and father."

MISS G: PROBLEM CHOICES

Directions: Select relevant problems and supporting data which are actual phrases from the case study. Record your choice by number on the answer sheet.
1. Alteration in thought processes
2. Alteration in nutrition: less than body requirements 3. Impaired verbal communication
4. Potential for ineffective airway clearance
5. Decreased activity tolerance
6. Alteration in comfort
7. Self-care deficit: toileting
8. Potential for violence
9. Potential for ineffective coping
10. Noncompliance
11. Ineffective family coping
12. Impaired mobility
13. Self-care deficit: bathing, dressing, grooming
14. Self-esteem disturbance
15. Sleep pattern disturbance
16. Potential for injury
17. Knowledge deficit
18. Potential for impaired skin integrity
19. Potential for infection

INTERVENTION PLAN FOR MISS G

Choices for Objectives

Directions: Choose one objective for each major problem, and place choice by number on answer sheet.

Objectives

1. Miss G will return to independent ambulation.
2. Miss G's mental state will not deteriorate during hospitalization.
3. Miss G will increase her activity.
4. Miss G will not develop pressure sores during hospitalization.
5. Miss G will become more compliant.
6. Miss G will accept toileting assistance from nursing staff.
7. Miss G will not sustain physical injury during hospitalization.
8. Miss G's infection will subside.
9. Miss G will cope with stress of hospitalization.
10. Miss G's verbal communication will improve.

Choices for Criteria

Directions: Choose 1-3 criteria for each major problem and indicate choice by number on answer sheet.
Criteria:
1. Miss G is compliant.
2. Miss G will not exhibit periods of agitation during hospitalization.
3. Miss G converses with staff effectively.
4. Absence of abrasions, bruises, soft tissue injuries and fracture.
5. Miss G is evaluated as a food candidate for gait training post repair of fractured hip.
6. Miss G will be free of infection.
7. Skin is intact.
8. Miss G will be able to identify herself.
9. Miss G is free of contractures.
10. Miss G will continue to respond to her own name.
11. Incontinence will be eliminated.
12. Absence of rash.
13. No redness.

Choices for Nursing Interventions

Directions: Choose 1-5 nursing interventions for each major problem and indicate choice by number on answer sheet.
Nursing Interventions:
1. Use positive reinforcement for continent voiding and defecation.
2. Relate to Miss G in a positive warm manner.
3. Place commode at bedside.
4. Locate Miss G in a room near the nurse's station if possible.
5. Apply sugar and Maalox mixture to buttock area.
6. Ambulate with walker 3 times a day.
7. Provide a consistent care-giver when possible.
8. Keep skin clean and dry.
9. Explain all procedures to Miss G simple, concisely, and calmly.
10. Assess the need for posey restraint while in bed (try to avoid this if possible).
11. Write on a tracking sheet each incident of voiding and defecation (continent and incontinent) for 3 days.
12. Place Miss G on a fracture pan according to toileting schedule.
13. Ambulate with walker 3 times a day.
14. Offer diet high in fluids and fiber.
15. Maintain side rails up in bed.
16. Provide soft plush object (e.g., stuffed animal, pillow, blanket) for Miss G.
17. Massage around bony prominences 3 times daily.
18. Turn and position Miss G every 2 hours.
19. Establish toileting schedule for Miss G based on her identified elimination pattern.
20. Apply water barrier ointment to perineal and buttock area.
21. Arrange for a consistent volunteer to visit Miss G on a regular basis.
22. Provide clock, calendar, radio, and/or tv for Miss G.
23. Arrange for foot board or heel protectors.
24. Answer Miss G's calls for help/assistance promptly (provide alternative to call bell if Miss G is unable to use it).
25. Assess incidence of pain.
26. Arrange for trapeze.
27. Guide Miss G through passive range of motion exercises within prescribed restrictions OD.
28. Orient Miss G to time, place, and person as needed.
29. Obtain air mattress.
30. Note changes in behavior exhibited by Miss G.

Choices for Rationale

Directions: Match rational with nursing intervention choices. Choose 1-5 rationale for each major problem and indicate choice by number on answer sheet.
Rationale:
1. Promotes self-esteem & confidence in plan of care.
2. Ambulation promotes optimum functioning of cardio-respiratory system.
3. Facilitates exercise and activity.
4. Promotes awareness of environment.
5. Irritants and moisture contributes to skin breakdown.
6. Placement in restraints prevents falls.
7. Prevents unsafe independent initiatives by Miss G.
8. Protects skin from irritation due to incontinence.
9. Nurturing communication promotes security.
10. Promotes dorsiflexion of feet.
11. Physical restraints often precipitate agitation and retard mobility.
12. Discomfort restricts movement.
13. To decrease or eliminate episodes of incontinence.
14. Meaningful visual and auditory stimulation are motivators for staying in touch with reality.
15. Familiarity with care-givers and routine promotes trust and security.
16. Promotes extra vigilance by nursing staff.

17. Knowing what to expect decreases fear and anxiety and enhances coping.
18. Establishment of an unconditional relationship promotes comfort, well-being, and some motivation to stay in touch with reality.
19. Pleasant tactile stimulation promotes comfort and well-being.
20. Promotes regular elimination.
21. To identify Miss G's elimination pattern.
22. Prevents constant pressure to any one are of skin surface.
23. Scheduled toileting based on individual elimination pattern is likely to be acceptable to the client and successful in preventing incontinence.
24. Promotes circulation and maintains joint mobility and muscle strength.
25. Prevents falls from bed.
26. Promotes circulation and maintains joint mobility and muscle strength.
27. Early detection enhances changes of successful intervention.
28. Allows for equal distribution of pressure to all areas of body.

--- --- ---

Answer Sheet

ID# _____

Directions for Problem Identification Section:

Select problems from the list provided. Indicate your choices by number on the problem identification section of this answer sheet.

Next select the supporting data phrases from the case study description. Indicate your choices by number on the supporting data section of this answer sheet.

Problem Indentification and Supporting Data

| Problem | Supporting Data |
|---------|-----------------|
| _____ | _____ |
| _____ | _____ |
| ... | ... |

Directions for Planning Section

Select from your problem choices the most important problems.

Next, select the objective, criteria, interventions, and rational for each major problem identified using the listings provided.

Indicate your choices by number on this answer sheet.

Objective, Criteria, Intervention and Rationale

Problem #1: _____
Objective: _____    Criteria: _____
Interventions:              Rationale for Interventions:
1. _____              1. _____
2. _____              2. _____
...                         ...

-continued
Objective, Criteria, Intervention and Rationale

Problem #2: _____
Objective: _____    Criteria: _____
Interventions:              Rationale for Interventions:
1. _____              1. _____
2. _____              2. _____
...                         ...

Problem #3: _____
Objective: _____    Criteria: _____
Interventions:              Rationale for Interventions:
1. _____              1. _____
2. _____              2. _____
...                         ...

--- --- ---

Directions for Intervention Section

Select from your problem choices the most important problems.

Next, select the objective, criteria, interventions, and rationale for each major problem identified using the listings provided.

Indicate your choices by number on the answer sheet.

Problem #4: _____
Objective: _____    Criteria: _____
Interventions:              Rationale for Interventions:
1. _____              1. _____
2. _____              2. _____
...                         ...

Problem #5: _____
Objective: _____    Criteria: _____
Interventions:              Rationale for Interventions:
1. _____              1. _____
2. _____              2. _____
...                         ...

Problem #6: _____
Objective: _____    Criteria: _____
Interventions:              Rationale for Interventions:
1. _____              1. _____
2. _____              2. _____
...                         ...

--- --- ---
\*    \*    \*

It is to be understood that the principles of the invention are not limited in their applicability to case studies, and in fact, are not content or situation specific. The principles of the invention are broadly applicable to evaluation of diagnostic reasoning in almost all situations, including general management situations, as will become evident from the following respondent version of an illustrative nursing management examination:

NURSING MANAGEMENT EXAMINATION

Directions:

You are the nurse responsible for the situation described in the following case study. Read the following definition of terms before you begin with the case study.

Definitions:

Nursing Assessment and Nursing Care: The elements inherent in this process are (1) problem identification, (2) major problem identification, (3) objectives, (4) criteria, (5) interventions, and (6) rationale.

Patient or Client Problems: an identified or potential unmet need of the client, family, or nurse.

Problem Choices: choices of all problems for case study description.

Supporting Data: direct or implied data from the case study description resulting in the identification of a particular problem.

Major Problems: most important problems for case study description.

Objectives: behaviors expected in the patient which provide direction for the intervention plan/nursing care section.

Criteria: measurable outcomes of an objective.

Interventions: intervention choices to be taken by nurse for each major problem.

Rationale for Interventions: reason cited by nurse for a specific nursing intervention.

There are two answer sheets provided. Complete the problem identification section by selecting the problems from the list provided. Indicate your choices by number on the problem identification section of the answer sheet. Next select the supporting data phrases from the case study description. Indicate your choices by number on the supporting data section of the answer sheet.

Next you will complete the nursing care section. Select from your problem choices the most important problems. Next select the patient-centered objective, criteria, interventions and rationale for each major problem identified using the listings provided. Indicate your choices by number on the nursing care answer sheets. Feel free to mark up this case study.

Avoid guessing so your choices reflect what you would actually do in a situation of this nature.

You may use the work sheet to briefly write your answers in short phrases and as a means to visualize your choices. Use an identifying number by each short phrase so your choices can be easily transferred to the answer sheets.

Thanks for your participation.

NURSING MANAGEMENT ON 11-7 SHIFT

CASE STUDY DESCRIPTION:

(1) You are the 11-7 RN in charge of 25 patients working with an LPN on Unit A, an acute medical floor. (2) On Unit B there is another RN and LPN. (3) The night supervisor is available on call.

(4) It is 1 AM and you have an emergency admission, Mrs. McDonald, who is 80 years old and has a diagnosis of (R) CVA. (5) She responds only to painful stimuli.

(6) Her BP is 200/90. (7) She has orders to be transcribed including: (8) Neuro check q 30 min. (9) A STAT IM medication (Vasodilator) to be given. (10) IV to be started.

(11) Mrs. Jones, a 54 year old patient with diagnosis of cardiac arrhythmia, is complaining of chest pain.

(12) The blood bank has called and stated the second unit of packed cells is ready for Mr. Block, a GI bleeder, who has one unit running now.

(13) You have ten medications to be given at 2 AM.

(14) Rounds must be made on all patients on your wing. (15) Five of the 25 patients have IV's running without pumps. (16) You have four incontinent patients who require care.

HOW WILL YOU MANAGE THE NURSING REQUIREMENTS BETWEEN 1 AM AND 3 AM?

Nursing Management: Problem Choices

Directions: First, select any number of relevant problems and the supporting data which are actual phrases from the case study. Record your choice by number on the answer sheet.

Second, select major problems and record them by number on the nursing care answer sheet.

1. All patients must be turned and positioned every 2 hours.
2. LPN needs emotional support and empathy.
3. Incontinent patients,
4. Pick up and hang second unit of packed cells for Mr. Block.
5. Mrs. Jone's chest pain.
6. Hourly nursing rounds.
7. Evaluate Mrs. McDonald for transfer to ICU.
8. Admit Mrs. McDonald.
9. Start I.V. on Mrs. McDonald.
10. Administer 2 AM medications.
11. Neuro check on McDonald every 30 minutes.
12. Check I.V. flow rates.
13. Unsafe staffing.
14. Transcribe doctors orders for Mrs. McDonald.
15. Stat vasodilator on Mrs. McDonald.
16. Staffing.

INTERVENTION PLAN CHOICES

Choices for Objectives:

Directions: Choose one objective for each major problem, and place choice by number on answer sheet.
Objectives:
1. Doctors orders for Mrs. McDonald will be carried out.
2. Skin integrity will be maintained for incontinent patients.
3. The medical regiment will be executed appropriately for all assigned patients.
4. Mrs. McDonald's condition will stabilize.
5. Comfort and safety of all assigned patients will be maintained.
6. Doctors orders for Mr. Block will be carried out.
7. Client needs will be met safely and adequately.
8. Staffing on the night shift will be increased to allow for emergencies.
9. Emergency medication route will be established and maintained.
10. Mrs. McDonald's condition is closely monitored.
11. Skin integrity of all patients will be maintained.
12. Stat medication for Mrs. McDonald will be available.
13. Mrs. Jones' cardiac status will be stabilized.

Choices for Criteria

Directions: Choose 1-3 criteria for each major problem and indicate choice by number on answer sheet.
Criteria:
1. Drugs for Mrs. McDonald are dispensed promptly.
2. The comfort and safety of all assigned patients will be maintained.
3. The medication regiment will be executed appropriately for all assigned patients.
4. Incontinent patients are turned and changed.
5. I.V. line will be functional.
6. An additional R.N. is regularly assigned to the night shift on Unit A.

7. Mrs. McDonald is transferred to ICU.
8. Doctor's orders for Mrs. McDonald will be carried out.
9. Mrs. McDonald's BP will be lowered.
10. Mrs. McDonald's CVA will not progress to an arrest.
11. 2 AM medications are given within limits of no more than one hour delay.
12. I.V. flow rates remain accurate.
13. LPN will accept directives without exhibiting signs and symptoms of stress.
14. The general condition of all assigned patients will continue to be assessed.
15. No pressure sores will develop tonight on any patient.
16. Mr. Block gets his second unit of packed cells within limits of safety (30 min.).
17. The execution of doctor's orders for Mrs. McDonald will be documented.
18. Mrs. Jones' cardiac pain will be relieved.

NURSING INTERVENTION CHOICES

Directions: Choose 1-5 nursing interventions for each major problem and indicate choice by number on answer sheet.

Nursing Interventions:
1. LPN will perform 30 minute neuro checks on Mrs. McDonald.
2. LPN will administer 2 a.m. medications during rounds.
3. RN will ask night supervisor to send another RN to start Mrs. McDonald's I.V.
4. RN will inform night supervisor of the status of the floor.
5. RN will assess Mrs. McDonald's neuro status.
6. LPN will check I.V. flow rate Q30 minutes with neuro checks.
7. Ask for nursing assistant to be floated to floor to change incontinent patients.
8. LPN will change incontinent patients and turn later in night during rounds.
9. RN will check I.V. flow rates during rounds on unstable patients.
10. Allow LPN to verbalize feelings about working under stress.
11. RN will ask night supervisor to send another RN to start Mrs. McDonald's I.V.
12. LPN will give stat IM vasodilator to Mrs. McDonald.
13. LPN and RN will take turns making 30 minute neuro checks and I.V.s on Mrs. McDonald with LPN reporting neuro checks to RN.
14. Refuse to continue tour of duty unless additional help is sent to floor.
15. RN will make rounds on unstable patients.
16. RN delegates 2 AM medication administration and rounds to LPN.
17. RN will hang 2nd unit of packed cells within 30 minutes of delivery.
18. Contact Mrs. McDonald's attending physician, apprise him/her of patient's condition, staffing situation, and urge transfer to ICU.
19. Inform supervisor of work load and assignments for your tour of duty.
20. Call supervisor to inform of under staffing.
21. Ask supervisor about availability of infusion pumps for use on your floor.
22. Recommend that an additional RN be regularly assigned to Unit A on the night shift.
23. Provide positive reinforcement for LPN.
24. RN will ask night supervisor to arrange for pick up and delivery of 2nd of unit packet cells for Mr. Block.
25. RN will medicate Mrs. Jones with standing order for nitroglycerin in sublingual tabs prior to calling M.D.
26. RN will take measures to relieve chest pain in accord with M.D. orders.
27. RN will transcribe the doctor's orders later.
28. RN will take Mrs. Jones vital signs and evaluate chest pain.
29. Document the problems on Unit A tonight.

RATIONALE CHOICES

Directions: Match rationale with nursing intervention choices. Choose 1-5 rationale for each major problem and indicate choice by number on answer sheet.

Rationale:
1. Judgment involved in managing a group of patients includes asking for assistance.
2. Inadequate staffing promotes poor nursing care.
3. Transfer to ICU for continued treatment is appropriate.
4. Blood products can be delayed safely for 30 minutes.
5. Verbalization of feelings promote coping.
6. Mrs. McDonald is unstable and she requires more monitoring.
7. I.V. flow rates can change quickly.
8. Neuro assessments will yield pertinent data.
9. Urgent patient's conditions take priority over other responsibilities.
10. Effect of the medication needs to be monitored.
11. Rounds can be postponed if necessary to care for unstable patients.
12. Doctor's orders should be carried out promptly and transcribed later in emergency situations.
13. The staffing on the night shift of Unit A places the lives of the patients in jeopardy.
14. RN in charge needs to be able to delegate responsibility to LPN appropriately.
15. Waiting too long to administer medication may extend injury.
16. Chest pain secondary to cardiac distress should be relieved immediately to prevent/minimize myocardial ischemia/necrosis.
17. Personal liability risk increases with under staffing.
18. I.V. infusion pumps are reliable monitors of I.V. flow rates.
19. Patients who have chest pain need to be assessed immediately by RN.
20. Positive reinforcement promotes job satisfaction and motivation.
21. Baseline data collection and initial evaluation of unstable patients should be done by the RN who is responsible.
22. Care of incontinent patients must be done to prevent skin breakdown but can be delayed to accommodate emergency situations.

The answer key to a situation test is created using a teacher disk containing software which, in this embodiment, is called "EDITOR.COM." This software can also be used to edit or correct answers to a previously generated situation test. Additionally, help screens may be included for the purpose of facilitating usage of the software. The teacher disk may further be provided with another section of software "CORRECT.COM"

which is used to grade the answers of the learner. In one embodiment, the learner disk, which contains the learner's answers, is inserted into a drive of a microcomputer, and the teacher disk is inserted into a second drive. The learners' answers are then compared against those in the answer key, and the resulting score can be written into an individual file maintained on magnetic media. The CORRECT.COM program first obtains the learner's answers, grades the problem identification section, and then grades the intervention plan. The learner's answers and scores are then printed for review.

Grading of the problem identification section and the intervention plan section is, in this embodiment of the invention, performed separately. However, the results of such grading may be presented in a unified, or consolidated, report, not only of the various sections for each examinee, but also for the various examinees. In this manner, the members in a group of examinees can be compared to one another, and as a group, to assist in the development of norms for the group, and of corrective curricula.

It is a particularly advantageous feature of the invention that the situation test and additionally the accompanying problem choices may be entered into a computer using any commercially available word processing software package. Alternatively, these may be provided in a test booklet which accompanies the software. This feature facilitates administration of the examination selectably independent of a computer, or with a computer.

An essential aspect of the invention is the ability to yield both, numerical and rating scores for both, assessment and plan sections. The plan section of the inventive process includes the multiple combinations of five components, including hypotheses, objectives, criteria, interventions, and rationale. There is no restriction on the number of problem choices or hypotheses.

As indicated in the examination, the examinee is directed to select from the problem listings the most important problems. Next he or she is directed to select the objective, criteria, intervention, and rationale for each major problem identified using the listings provided. Only one objective is allowed for each major problem. Each of the listings provided within the situation test include distractors. One to three criteria may be used for a major problem, in this specific embodiment, and one to five interventions and rationale for interventions may be used for each major problem. Interventions and rationale are scored separately, but the system of the present invention also looks for a match between a specific intervention and specific reason. Some known grading systems ask the examinee to provide interventions, but generally do not ask for rationale, or grade its relationship to specific interventions.

The process of the present invention also includes in certain aspects thereof creation of a situation test, which is independent of the grading process. The focus of the software process is to grade the responses of an examinee to a given situation, and to compare the responses to an answer key. In some embodiments, this results in the production of an individualized printout containing indications of the validity of the responses by the individual examinee, rather than merely a global response which states only the percentage of correct responses by the examinee.

In accordance with another significant aspect of the invention, and as will be described hereinbelow with respect to FIGS. 2-8, not all of the six components noted hereinabove need be used in every examination environment. In those environments where the software pertaining to the entire, or master, system is employed, but not all components are required, the portion of the printout pertaining to the unused components may appear as all zeroes. It is to be understood, however, that the present invention is not limited to the specific combinations of components indicated hereinbelow.

In the creation of an examination in accordance with the master diagnostic reasoning evaluation instrument of the invention, the following essential components of a situation test are required:
1. Narrative description of situation with numbered phrases or elements.
2. Problem and hypothesis listings, preferably with distractors.
3. Objective listing with distractors.
4. Criteria listing with distractors.
5. Intervention listing with distractors.
6. Rationale listing with distractors.
7. Answer key prepared by trainer/teacher or panel of experts including correct responses as follows:
   a. Problem choices with substantiating data phrases with coded numbers for each such problem choice. For example, consider the following:
   Problem: Malnutrition (2)
   Substantiating data:
      1: Weight loss $\Delta=(2)$
      2: Protruding abdomen $\Delta=(4)$
      3: Low Hemoglobin $\Delta=(12)$
      4: Fatigue $\Delta=(30)$
   b. Hypotheses or major problem choices with intervention plan for each major problem, with coded numbers for each.

BRIEF DESCRIPTION OF THE DRAWING

Comprehension of the invention is facilitated by reading the following detailed description in conjunction with the annexed drawing, in which.

DETAILED DESCRIPTION

Figure 1:
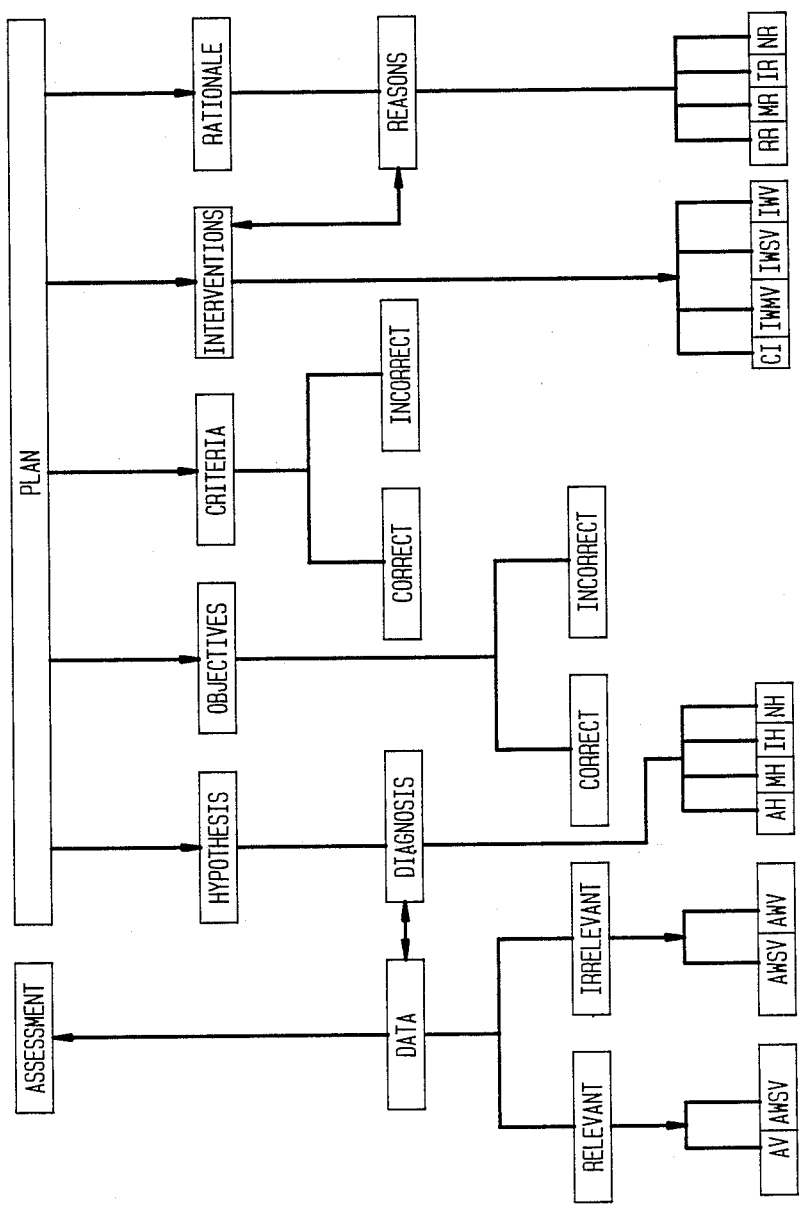
FIG. 1 is a block and line representation of a master diagnostic reasoning instrument which is useful in providing an evaluation of the ability of a learner to assess a situation and propose a valid intervention plan.

FIG. 1 is a block and line representation of a diagnostic reasoning instrument which is useful in providing an evaluation of the ability of a learner to assess a situation and propose a valid intervention plan. As shown in this figure, there are six major components of the general system, the components being entitled "assessment," "hypothesis," "objectives," "criteria," "interventions," and "rationale." As will be discussed hereinbelow with respect to the other drawing figures, these six elements can be combined in different manners in accordance with the reasoning patterns of respective disciplines of fields of study. In FIG. 1, however, the master design is represented for a system which evaluates the diagnostic reasoning required in a complex field, illustratively health care nursing.

In the master design shown in FIG. 1, assessment and plan are the two central ingredients for diagnostic reasoning. Assessment is based on the identification of problems for a given narrative description. The written situation test, as indicated previously, contains coded phrases which are both relevant and irrelevant. The learner, or examinee, being evaluated is first provided with the narrative and then is asked to select by number from a listing of problems which may or may not be inherent in the situation, and which the professional should address. In addition, the examinee is expected in this embodiment to select illustratively between one and four data phrases by number from the narrative description which support each problem choice.

The master flow diagram of the diagnostic reasoning instrument of FIG. 1 illustrates that the data choices are classified as RELEVANT or IRRELEVANT. The ability of an examinee to make an assessment is scored numerically and rated as assessment with validity (AV), assessment with some validity (AWSV), and assessment without validity (AWV). A numerical score for this section is based on a predetermined weighting for each problem identified by the examinee. The rating for this section is based on the total number of problems identified correctly and incorrectly.

The PLAN section of the diagnostic reasoning instrument of FIG. 1, which is the most comprehensive form, consists of five components:

1. HYPOTHESES are responses by the examinee to the examination question, "Select from your problem choices the most important problems." The learner is expected to delimit further the problem choices using the same problem listing provided in the situation test and used for assessment. A rating classification for these choices is provided in a computerized printout (not shown) to the learner, but not a separate numerical score. The ratings for HYPOTHESES are classified as appropriate (AH), mixed (MH), inappropriate (IH), and no hypothesis (NH). These ratings are determined by number and are dependent upon the accuracy of the major problem choices.

2. OBJECTIVES are selected by the learner for each major problem from a listing provided within the situation test. The program of the present invention, as will be described hereinbelow, grades these response as correct or incorrect, but no rating is provided. These response are stored for grading purposes.

3. CRITERIA describe achievement of an OBJECTIVE and are also provided in a listing. The learner is expected to select, in this specific illustrative embodiment, between one and three CRITERIA for each major problem. The selections are graded by the program of the present invention as correct or incorrect.

4. INTERVENTIONS which are determined by the examinee as being required to be taken by the professional to solve the client problems are provided within the situation test. In this specific embodiment, the program restricts these choices to a maximum of 5 for each major problem, or within a range of 1 to 5 interventions for each major problem choice. Each INTERVENTION choice is graded as either correct or incorrect, and the program determines whether it matches a predetermined RATIONALE. An intervention rating is calculated for each major problem based upon the degree of match with the answer key. Intervention classifications are: intervention with most validity (IWMV), intervention with some validity (IWSV), and intervention without validity (IWV). A one-half point is given for each correct intervention (CI).

5. RATIONALE are selected from a listing by the learner for each intervention selected. Each RATIONALE is rated as either correct or incorrect by the program, and a rationale rating is derived on the basis of RATIONALE choices for each major problem. The rationale ratings are: relevant rationale (RR), mixed rationale (MR), incomplete rationale (IR), and rationale without validity (NR).

As is evident from the foregoing, the master, or general, diagnostic reasoning instrument of the present invention, as shown in FIG. 1, includes two sections, assessment and plan, with a total of six components. After completion of the examination by the examinee, the process of the present invention grades all of the components, resulting in three numerical scores and four ratings. The ASSESSMENT numerical score is based on the problem choices with supporting data phrase. The PLAN numerical score is based on choices for HYPOTHESES, OBJECTIONS, CRITERIA, INTERVENTIONS, and RATIONALE. A total score for a given situation test is the combined numerical score for both the ASSESSMENT and PLAN sections.

The four ratings are for ASSESSMENT, HYPOTHESIS, INTERVENTION, and RATIONALE components.

Figure 2:
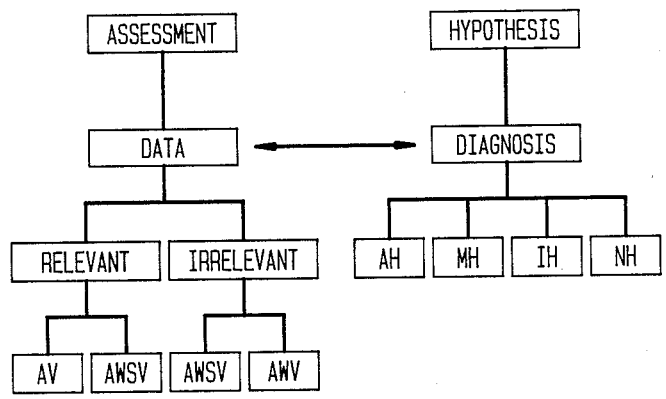
FIG. 2 is a block and line representation of a diagnostic reasoning instrument which is useful in providing an evaluation of the ability of a learner to work-up a diagnosis.

FIGS. 2–8, described hereinbelow, pertain to various combinations of the elements noted hereinabove in the master diagnostic reasoning instrument, the diagnostic reasoning instruments formed of such combinations being adaptable to specific fields or disciplines:

FIG. 2 is a block and line representation of a diagnostic reasoning instrument which is useful in providing an evaluation of the ability of a learner to work up a diagnosis. The model of the diagnostic reasoning instrument represented herein includes the two components of ASSESSMENT and HYPOTHESIS. Thus, this instrument is particularly suited for use in fields which focus on diagnosis. The primary emphasis of the field of medicine is on the identification of a diagnosis based on taxonomy. An integral part of a diagnostic work-up includes the data collection and the sorting of data. The collecting of the correct data, not just a large amount of data, must be performed before a correct diagnosis can be achieved. Generally, a physician makes a list of possible hypotheses at the conclusion of a physical examination and after obtaining a medical history. The advantage of the present inventive program over this process is that it can quickly test a learner and/or practitioner's ability to perform the assessment and diagnosis process properly. The diagnostic reasoning instrument of FIG. 2 should be used for fields which focus on written diagnosis formation based on sound or standardized data collection methods.

Figure 3:
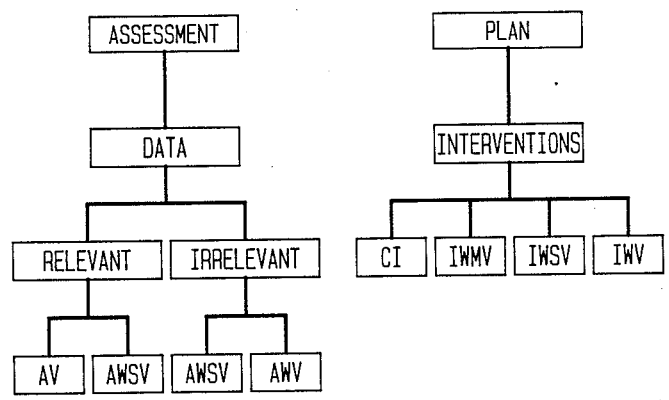
FIG. 3 is a block and line representation of a diagnostic reasoning instrument which is useful in providing an evaluation of the ability of a learner, illustratively in the field of equipment repair, to assess a situation and effect repair.

FIG. 3 is a block and line representation of a diagnostic reasoning instrument which is useful in providing an evaluation of the ability of a learner, illustratively in the field of equipment repair, to assess a situation and effect repair. This diagnostic reasoning instrument focuses on ASSESSMENT and PLAN components. Technicians and repair service personnel are expected to assess a situation and then repair the equipment problem. The advantage of the present program is that it will accept any situation that a trainer designs and it is not limited to a specific field of endeavor. Thus, this system can be used to evaluate the skills of, for example, computer technicians, auto mechanics, or engineering technicians. In addition, this system can be used to determine the ability of an administrative assistant to assess a situation and intervene. Such situations can relate to equipment or clients.

Figure 4:
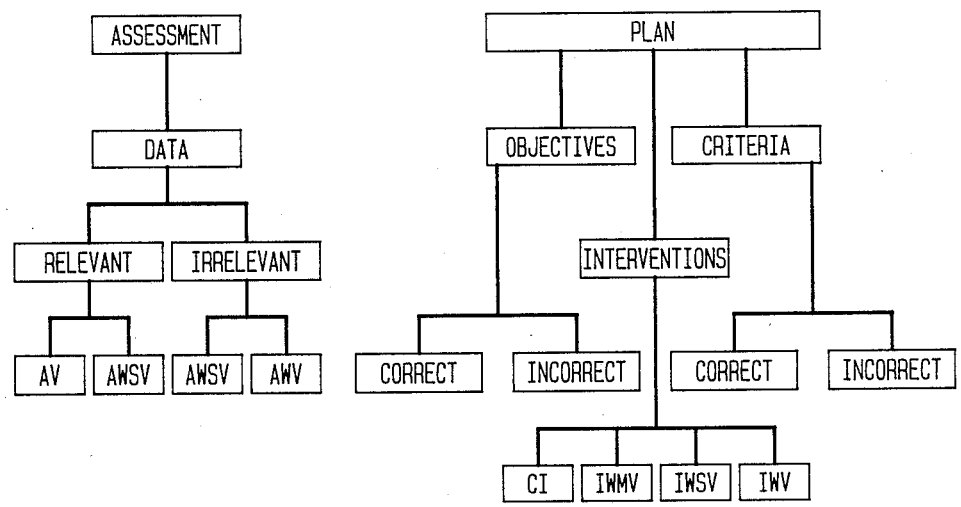
FIG. 4 is a block and line representation of a diagnostic reasoning instrument which is useful in providing an evaluation of the ability of a learner, illustratively in a sales field, to assess a consumer, generate an objective as to what to sell, and make a sale.

FIG. 4 is a block and line representation of a diagnostic reasoning instrument which is useful in providing an evaluation of the ability of a learner, illustratively in a sales field, to assess a consumer, generate an objective as to what to sell within a given situation, and make a sale. A critical component of making a sale is to have a plan. The diagnostic reasoning instrument of this figure utilizes OBJECTIVES, INTERVENTIONS, and CRITERIA as the three components of a PLAN, or sales presentation. In various sales industries, it is understood that terminology may differ from that presented herein, but the components remain the same.

Figure 5:
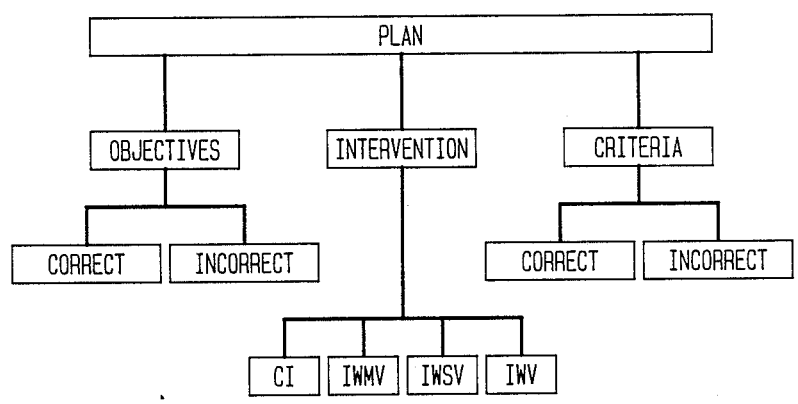
FIG. 5 is a block and line representation of a diagnostic reasoning instrument which is useful in providing an evaluation of the ability of a learner to produce an intervention pursuant to a plan based on criteria which need not be stated.

FIG. 5 is a block and line representation of a diagnostic reasoning instrument which is useful in providing an evaluation of the ability of a learner to produce an intervention pursuant to a PLAN based on CRITERIA which need not be verbalized. For example, an architect focuses on a plan for a given situation and may write or state an OBJECTIVE, and make a drawing (intervention). The criteria may be, for example, whether the building will stand, but this criteria need not be stated. The primary focus of this field is the INTERVENTION design (plan).

Figure 6:
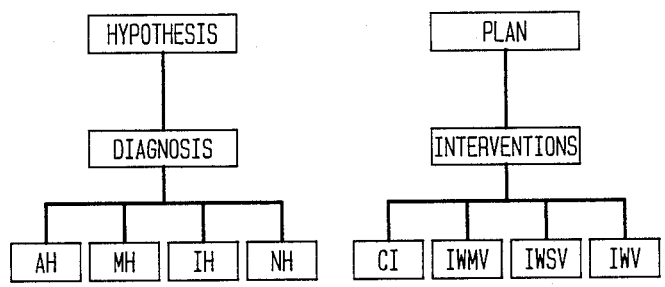
FIG. 6 is a block and line representation of a diagnostic reasoning instrument which is useful in providing an evaluation of the ability of a learner to make a hypothesis and intervene, without data collection.

FIG. 6 is a block and line representation of diagnostic reasoning instrument which is useful in providing an evaluation of the ability of a learner to make a HYPOTHESIS and specify INTERVENTIONS. Thus, the PLAN is the INTERVENTIONS, and therefore the diagnostic reasoning instrument of this figure is helpful in evaluating the creativity of a learner. Data collection is not specified as an integral part of this process. A learner may have an idea about the environment and a plan to carry it out, but the situation may or may not be confined to a natural environment or one known to any extent by the examinee. For example, the environment may be artificial, such as voice synthesis.

Figure 7:
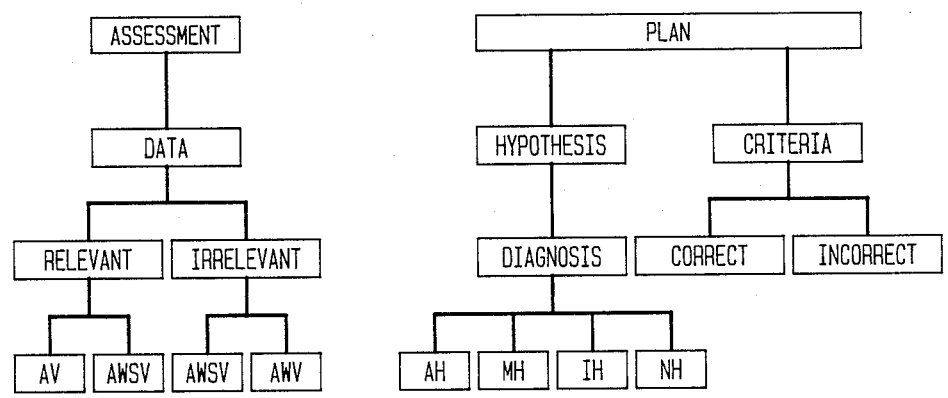
FIG. 7 is a block and line representation of a diagnostic reasoning instrument which is useful in providing an evaluation of the ability of a learner to assess a given situation using verbalization of data, and to formulate a plan using valid criteria.

FIG. 7 is a block and line representation of a diagnostic reasoning instrument which is useful in providing an evaluation of the ability of a learner to assess a given situation using verbalization of data, and formulate a PLAN using valid CRITERIA. This diagnostic reasoning instrument is useful in assessing how humans should approach daily situations. First, a situation must be assessed completely by collecting data. Then a PLAN is created, using HYPOTHESIS and CRITERIA. In fields where the emphasis is on a verbalization of assessment stage and data sorting, prior to determining the problem, this system is appropriate or applicable. In this system, intervention is of secondary importance or not a consideration at all, whereas thinking is primary. Examples of fields in which this system could be used include logic, philosophy, and aesthetics.

Figure 8:
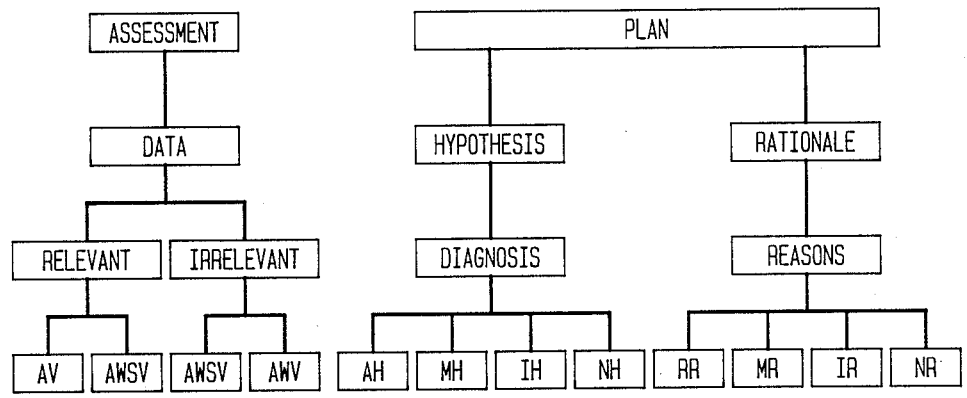
FIG. 8 is a block and line representation of a diagnostic reasoning instrument which is useful in providing an evaluation of the ability of a learner to assess a given situation, and articulate hypotheses and rationale.

FIG. 8 is a block and line representation of a diagnostic reasoning instrument which is useful in providing an evaluation of the ability of a learner to assess a given situation, and articulate HYPOTHESES and RATIONALE. This system is particularly adaptable to the physical sciences which focus on premises (ASSESSMENT), conclusions (HYPOTHESES), and criteria (RATIONALE). This system emphasizes the major goal of the physical sciences which is to make discoveries.

Figure 9:
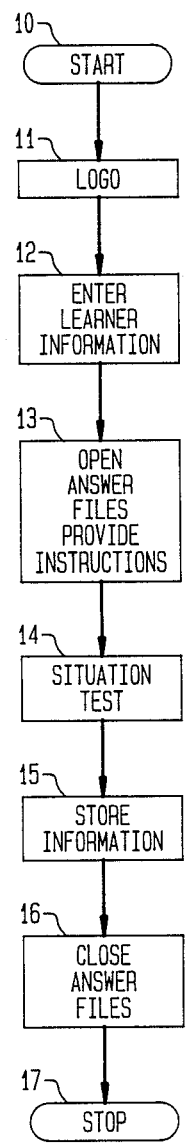
FIG. 9 is a block diagram of the process in a learner disk of a software program formulated in accordance with the invention.

FIG. 9 is a block diagram which is useful in describing generally the process of taking an examination in accordance with the invention. First, the program variables are initialized, at step 10, illustratively by booting the system which may be installed on a computer disk containing at least a portion of a disk operating system. Such initialization results in production of a screen (not shown) at step 11 which could be used to identify the school or institution, or any other similar information. The learner then enters his or her unique information at step 12 which results in the opening of the files at step 13. Subsequently, at step 14, the examination is taken and the learners' answers are stored at step 15. Upon completion of the examination, the answer files are closed, at step 16, and the process is stopped at step 17.

Figure 10:
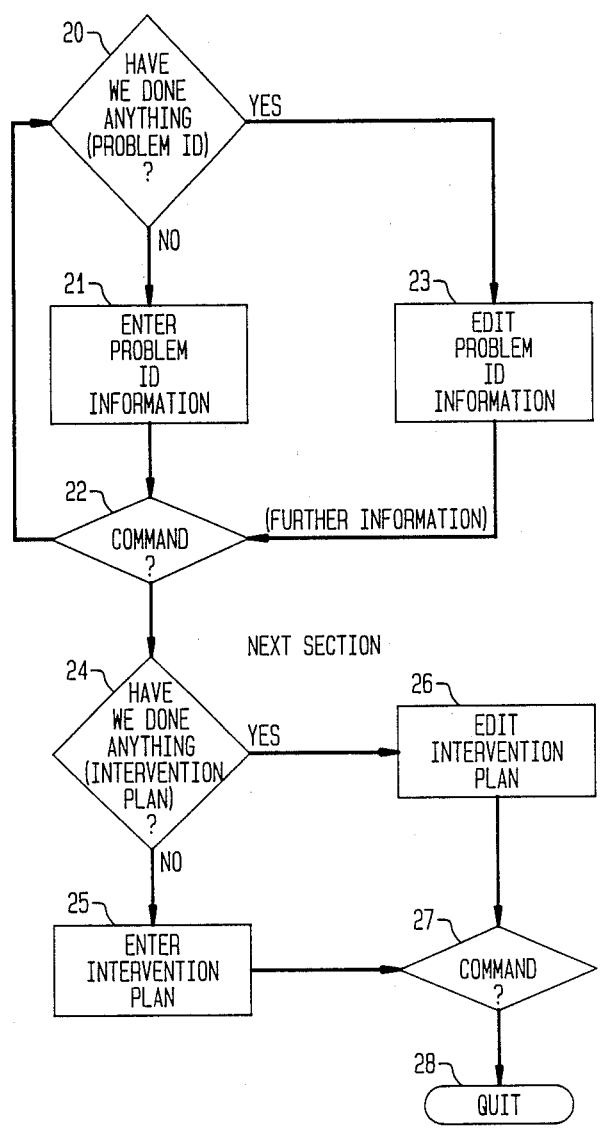
FIG. 10 is a block diagram which illustrates the answering of problem identification and intervention plan sections of an examination.

FIG. 10 is a logic flow chart which illustrates the taking of the examination. Initially, at step 20, a determination is made whether any problems have yet been identified. Prior to commencing the examination, no problems have been identified, and therefore the system proceeds to step 21 where the code numbers associated with selected ones of the problem choices are entered. The program then proceeds to a command step 22 where a decision is made by the learner whether to edit the program identification information, or proceed to the intervention plan section. If edit is desired, the process returns to step 20, and, since program identification information has been stored, editing information is generated at step 23. Upon completion of the editing, the process returns to command step 22, and a similar process is repeated for the intervention plan.

In the intervention plan portion of the examination, a determination is made at step 24 whether the intervention plan answers have been entered, and if not, the process proceeds to step 25 where the learner enters the intervention plan. Again, if the learner desires to edit the intervention plan, such editing can be achieved at step 26. After editing, a decision is made at command step 27 whether or not to quit, as shown at step 28.

Figure 11:
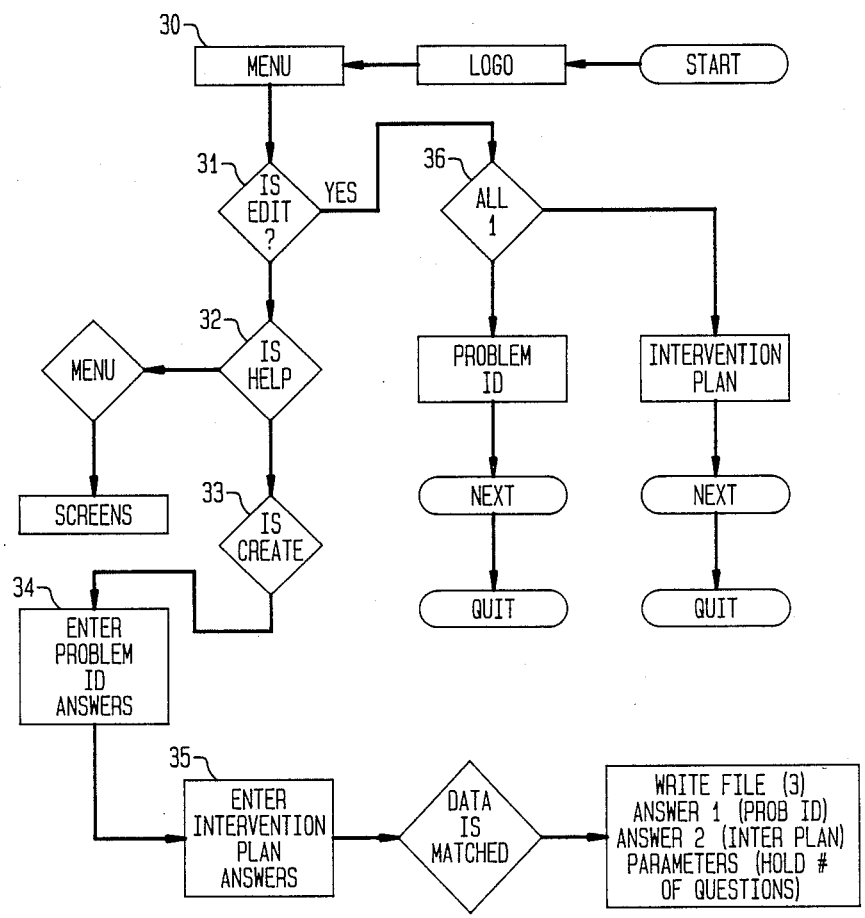
FIG. 11 is a logic diagram illustrating an editor sequence in a teacher disk of a software program formulated in accordance with the invention.

FIG. 11 is a logic diagram of the process present on the teacher disk for creating and editing answer keys. After initialization of the system and generation of a logo screen, the process proceeds to generate a menu, as illustrated at process step 30. If it is determined at process step 31 that editing is not desired, the process proceeds to request at step 32 whether help is required. If not, the new answers are created at step 33 and are entered at step 34. As shown, first the problem identification answers, and then the intervention plan answers are entered at step 35. This data is subsequently stored. However, if it is desired to edit the answer key, the appropriate key is selected at step 36.

Figure 12:
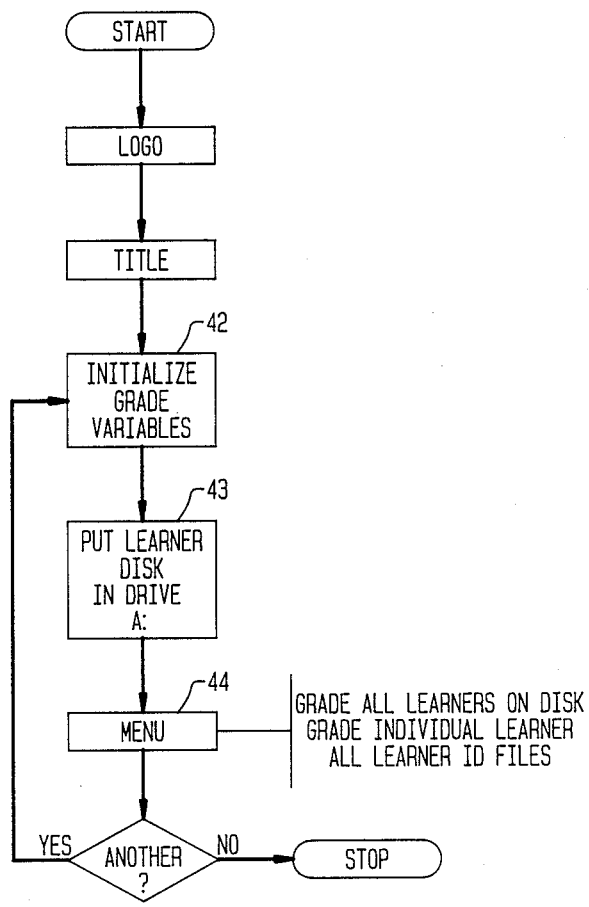
FIG. 12 is a logic diagram which illustrates the overall process of grading learner responses.

FIG. 12 is a block diagram of a process for grading the answers of the learners. After initialization of the grade variables at step 42, the learner disk is inserted in drive A, in this embodiment, of a microcomputer system at step 43. In this specific embodiment, a menu is generated at step 44 which allows the teacher to grade individual learners, grade all of the learners at once, or obtain a list of learners who completed the situation test. Each learner's score is stored on the disk and can be printed.

Figure 13:
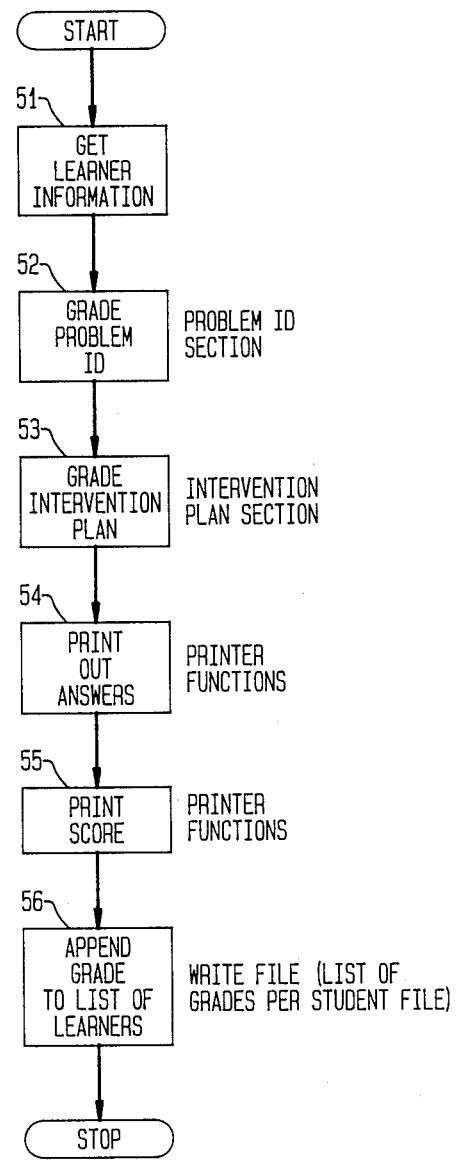
FIG. 13 is a block diagram of the process of printing the answers and score of a learner.

FIG. 13 is a block diagram of an overview of the examination correction process. Learner information is obtained at step 51 and the problem identification and intervention plan sections are graded at steps 52 and 53, respectively. The learners' answers and the resulting score are printed at steps 54 and 55. Finally, the learners score is written into a respective file at step 56.

Figure 14:
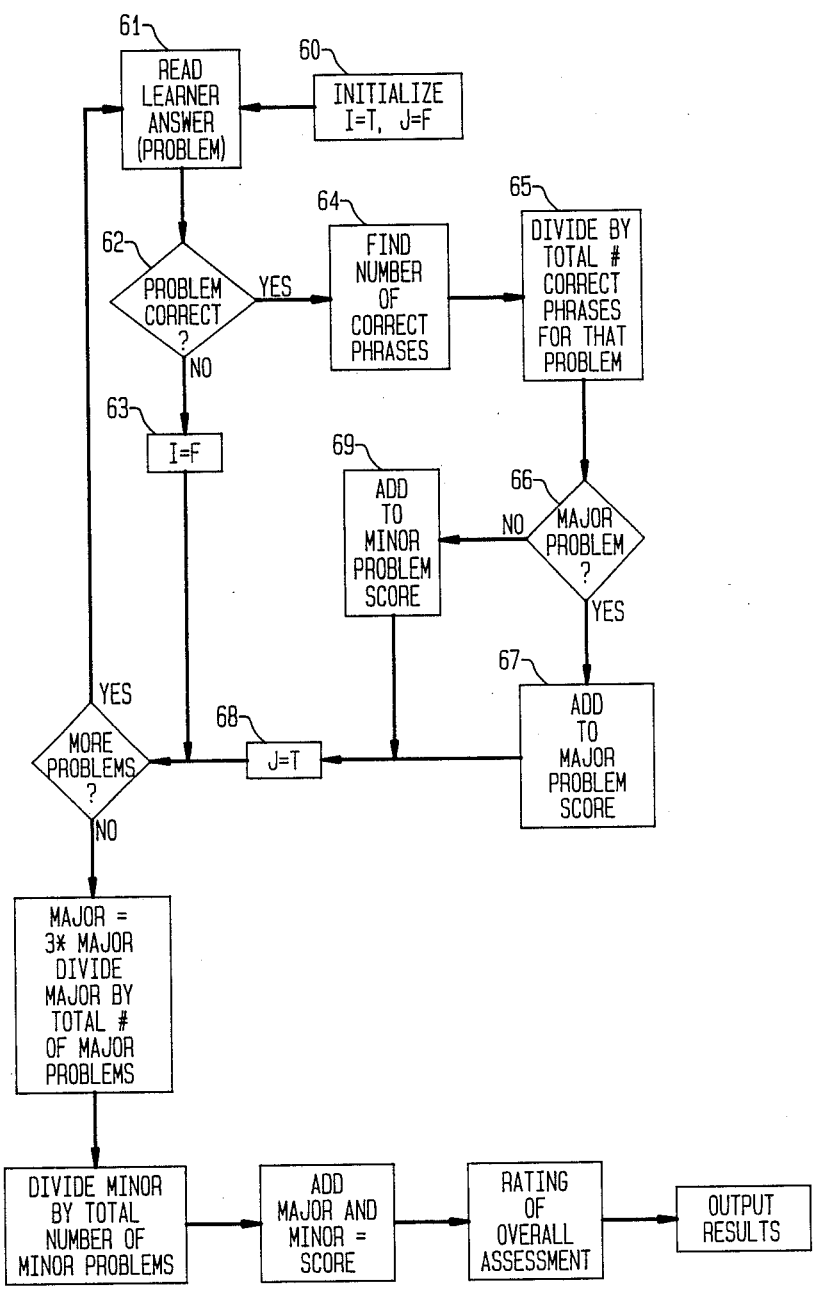
FIG. 14 is a logic diagram of the process of grading the problem identification section.

FIG. 14 is a logic diagram of the examination grading process. Software flags I and J are initialized at step 60. In this embodiment, software flag I is set to "true" and software flag J is set to "false." These flags allow the program to establish the conditions under which the learners' answers to the problems are determined to be correct, partially correct, or incorrect. This process analyzes all of the responses for all of the problems, and provides a rating of the learner's overall judgment. The validity of the learner's judgment is measured irrespective of the number of problems which have been completed. However, in this embodiment of the invention, as will be discussed below, there is additionally provided a score which reflects the number of problems completed. In other words, credit is given for extra effort in completing additional problems during the examination.

In this embodiment, software flag I assumes a true state if all of the problems are correct. Software flag J assumes a true state if at least one problem is correct. Thus, the following conditions operate in the system:

| Software Flags | | |
|---|---|---|
| I | J | |
| T | T | Assessed with validity, all problems correct |
| T | F | Cannot exist |
| F | T | Some right and some wrong, assessed with some validity |
| F | F | All are wrong, assessed with no validity |

This rating system can accurately evaluate the performance of a learner who might only answer one or two problems correctly. In addition to the software flags, a scoring system is also present to recognize extra effort by an individual who might work on many more problems in the same context with the same degree of accuracy. Both learners would achieve the same rating, but the learner who completed more problems would get a higher score.

After the initialization, the learners' answers are read by the computer at step 61. The answers to the problem are compared for correctness at step 62, and if the answer is not correct, the I flag is set to false at step 63. However, if the problem was answered correctly, the data phrases are then examined at step 64. The number of correct data phrases found for each correct problem is divided by the total number of correct data phrases for that problem, and the resulting fraction is added to the score.

At step 66, a determination is made whether the problem was a major one. If so, at step 67, the problem score is added to the major problem total; otherwise it is added to the minor problem total in step 69. Then software flag J is set to true at step 68.

This sequence continues until all of the problems have been graded. At that time, the major problem score is multiplied by a predetermined number, illustratively 3, so as to provide more credit for recognizing the most important problems. Then the major and minor problem scores are divided by the total number of correct problems in their respective categories and both scores are combined. This results in a score of the overall assessment ability of the learner and the results are displayed or printed.

Figure 15:
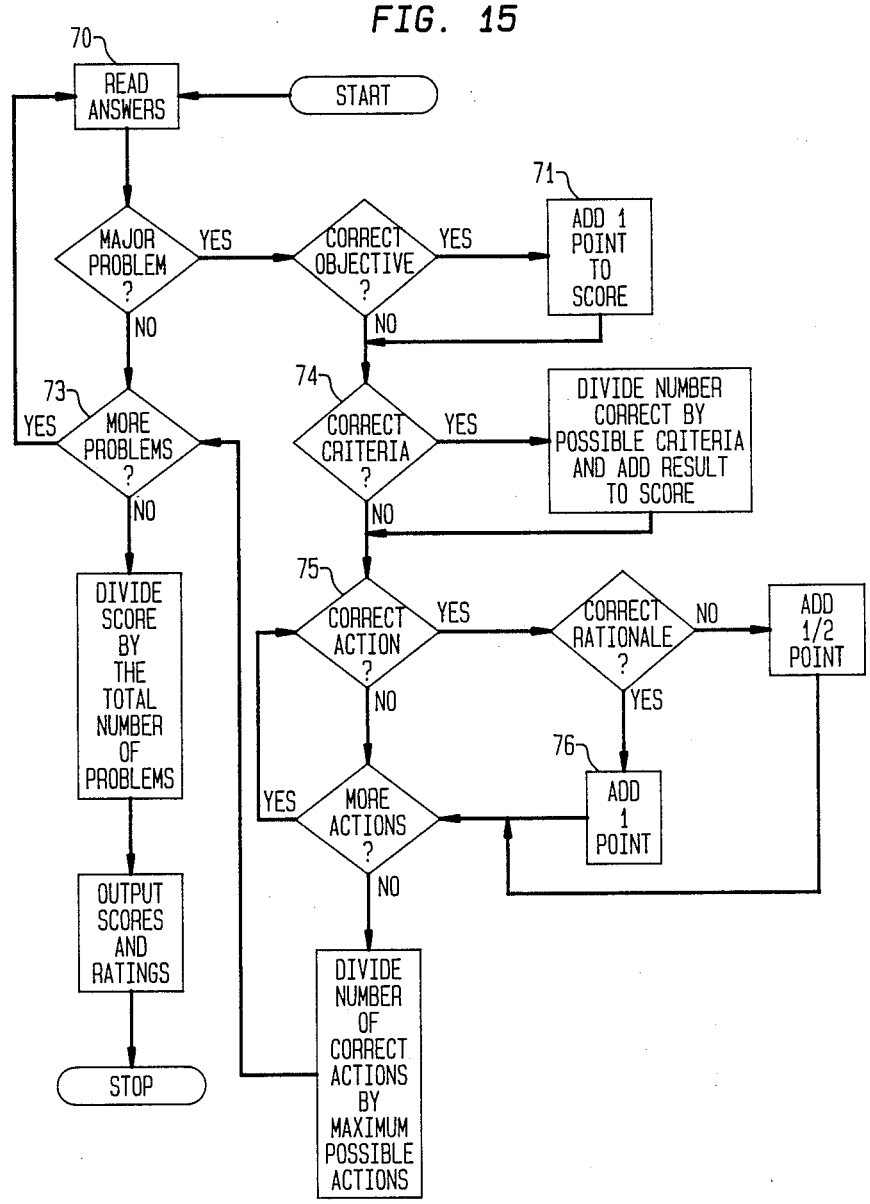
FIG. 15 is a logic diagram illustrating the process of grading the intervention plan section.

FIG. 15 is a logic diagram of a system for grading the intervention plan of a learner. After reading the learner's answer at step 70, a determination is made as to whether the problem is a major one. If the problem is major, one point is awarded for a correct objective in step 71. Then, the criteria is examined for correctness at step 74. The number of correct criteria found is divided by the number of correct criteria possible. The resulting fraction is added to the score. The interventions are then checked at step 75, and if the associated rationales are correct one point is added. However, if the rational is not correct, only one-half point is awarded. When all of the interventions for each problem have been evaluated, the score is divided by the total number of interventions for that problem. A rating is produced, illustratively as an output, for each problem.

If the problem is not major, then the system will search for more problems at step 73 until all problems are evaluated. When no further problems are found, the score is divided by the total number of problems and an output of overall scores and ratings is produced.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of operating a computing machine to assess the reasoning ability of an examinee to be evaluated, the method comprising the steps of:
   first storing in a test memory area situation data corresponding to respective situation phrases in a test situation description which describes a predetermined test situation, said test situation description being substantially narrative and formed of a plurality of said situation phrases, each situation phrase having associated therewith a respective phrase identification symbol;
   second storing in a problem identification memory area problem data corresponding to a plurality of predetermined problems each having a respective degree of pertinence to said test situation;
   third storing in a problem selection memory area a problem selection response by the examinee, said problem selection response specifying a selection by the examinee of at least one of said predetermined problems as being considered by the examinee to have a significant degree of pertinence to said test situation;
   fourth storing in a problem selection support memory area data corresponding to a problem selection support response by the examinee, and specifying a selection by the examinee of ones of said situation phrases which support said problem selection response;
   fifth storing in an objectives identification memory area objectives data corresponding to a plurality of predetermined objectives;
   sixth storing in an objectives selection memory area data corresponding to an objective selection response specifying one of said predetermined objectives as being considered by the examinee to be a correction to the predetermined problem selected in said step of third storing;
   seventh storing in a criteria identification memory area data corresponding to a plurality of predetermined criteria;
   eighth storing in a criteria selection memory area data corresponding to a criteria selection response specifying at least one of said predetermined criteria as being considered by the examinee as supporting said predetermined objective selected in said step of sixth storing;
   ninth storing in an intervention identification memory area data corresponding to a plurality of predetermined interventions;
   tenth storing in an intervention selection memory area data corresponding to at least one of said predetermined interventions selected by the examinee to resolve a problem identified in said step of third storing;
   eleventh storing in a rationale identification memory area data corresponding to a plurality of predetermined rationales; and
   twelfth storing in a rationale selection memory area data corresponding to at least one of said predetermined rationales considered by the examinee as supporting said predetermined intervention selected in said step of tenth storing, including at least a selected one of said phrase symbols for supporting said predetermined intervention.

2. The method of claim 1 wherein there is provided the further step of editing said problem selection response made in said step of third storing.

3. The method of claim 1 wherein there is provided the further step of editing said intervention selection response made in said step of tenth storing.

4. A method of operating a computing machine to assess the reasoning ability of an examinee to be evaluated, the method comprising the steps of:
   first storing in a test memory area situation data corresponding to respective situation phrases in a test situation description which describes a predetermined test situation, said test situation description being substantially narrative and formed of a plurality of said situation phrases, each situation phrase having associated therewith a respective phrase identification symbol;
   second storing in a problem identification memory area problem data corresponding to a plurality of predetermined problems each having a respective degree of pertinence to said test situation;
   third storing in a problem selection memory area a problem selection response by the examinee, said problem selection response specifying a selection by the examinee of at least one of said predetermined problems as being considered by the examinee to have a significant degree of pertinence to said test situation;
   fourth storing in a problem selection support memory area data corresponding to problem selection support response by the examinee, and specifying a selection by the examinee of ones of said situation phrases which support said problem selection response;
   fifth storing in an intervention identification memory area data corresponding to a plurality of predetermined interventions;
   sixth storing in an intervention plan selection memory area data corresponding to at least one of said predetermined interventions selected by the examinee to resolve a problem identified in said step of third storing;
   seventh storing in a rationale identification memory area data corresponding to a plurality of predetermined rationales;
   eighth storing in a rationale selection memory area data corresponding to at least one of said predetermined rationales considered by the examinee as supporting said predetermined intervention selected in said step of tenth storing, including at least a selected one of said phrase symbols for supporting said predetermined intervention;
   ninth storing in a problem selection support answer memory area data corresponding to correct ones of said situation phrases;
   initializing to a first state first and second software flags, each having first and second states;
   comparing said problem selection support response by the examinee for a problem selected by the examinee against said data in said problem selection support answer memory area;
   first setting said first software flag to said second state in the event at least one of said situation phrases in said problem selection response by the examinee matches its corresponding correct answer in said data in said problem selection support answer memory area, in said step of comparing; and second setting said second software flag to said second state in the event all of said situation phrases in said problem selection response by the examinee match their corresponding correct answers in said data in said problem selection support answer memory area, in said step of comparing.

5. The method of claim 4 wherein there are provided the further steps of:

determining whether said data in said problem selection memory area corresponds to a predetermined major problem;

first accumulating a single problem score corresponding to the score of the examinee on a major problem selected by the examinee; and second accumulating a major problems score corresponding to the score of the examinee on all major problems selected by the examinee.

* * * * *